United States Patent
Wirth et al.

(10) Patent No.: US 10,365,660 B2
(45) Date of Patent: Jul. 30, 2019

(54) COMPUTER SYSTEM AND METHOD FOR AUTOMATED INDOOR SURVEYING BY ROBOTS

(71) Applicant: Savioke, Inc., San Jose, CA (US)

(72) Inventors: Stephan Wirth, Palma de Mallorca (ES); Phil Herget, Sunnyvale, CA (US); Steve Cousins, San Jose, CA (US)

(73) Assignee: Savioke, Inc., San Jose, CA (US)

(*) Notice: Subject to any disclaimer, the term of this patent is extended or adjusted under 35 U.S.C. 154(b) by 0 days.

(21) Appl. No.: 15/799,738

(22) Filed: Oct. 31, 2017

(65) Prior Publication Data

US 2019/0129444 A1    May 2, 2019

(51) Int. Cl.
| | |
|---|---|
| *G01C 21/32* | (2006.01) |
| *G01C 21/34* | (2006.01) |
| *G06F 17/00* | (2019.01) |
| *G06F 3/06* | (2006.01) |
| *G05D 1/02* | (2006.01) |
| *B25J 5/00* | (2006.01) |
| *H04B 17/318* | (2015.01) |

(52) U.S. Cl.
CPC ............ *G05D 1/0274* (2013.01); *B25J 5/007* (2013.01); *G05D 1/0212* (2013.01); *H04B 17/318* (2015.01); *Y10S 901/01* (2013.01)

(58) Field of Classification Search
CPC ...... G05D 1/0274; G01C 21/32; G01C 21/00; G01C 21/34; G01C 21/26; G01C 21/30; G06F 3/06; G06F 17/00
See application file for complete search history.

(56) References Cited

U.S. PATENT DOCUMENTS

| | | | | |
|---|---|---|---|---|
| 2004/0193370 A1* | 9/2004 | Umezu | ................... | G01C 21/32 701/450 |
| 2004/0267441 A1* | 12/2004 | Kim | ....................... | G01C 21/26 701/410 |
| 2007/0156759 A1* | 7/2007 | Sekine | ................... | G01C 21/32 |
| 2008/0040030 A1* | 2/2008 | Oohashi | ................ | G01C 21/32 701/452 |
| 2010/0286907 A1* | 11/2010 | Hilbrandie | ............ | G01C 21/32 701/533 |

(Continued)

*Primary Examiner* — Yuri Kan
(74) *Attorney, Agent, or Firm* — Hickman Palermo Becker Bingham LLP (57) ABSTRACT

A method for autonomous sensor data collection by a robot comprising: receiving, at the robot, a digitally stored initial map representing a plurality of locations within an environment, wherein each location of the plurality of locations is associated with first sensor data; determining, based on the initial map and one or more stored parameters, whether one or more portions of the initial map should be updated; in response to determining one or more portions of the initial map should be updated, the robot calculating a route to one or more target locations corresponding to the one or more portions of the initial map, and the robot physically traversing the environment on the route; during traversal of the route, collecting second sensor data from one or more sensors of the robot at each target location of the one or more target locations; generating updated map data associating each target location of the one or more locations with respective updated sensor data based on the second sensor data.

20 Claims, 7 Drawing Sheets

(56) References Cited

U.S. PATENT DOCUMENTS

| | | | | |
|---|---|---|---|---|
| 2013/0345977 A1* | 12/2013 | Shimizu | ............... | G01C 21/34 |
| | | | | 701/533 |
| 2016/0096443 A1* | 4/2016 | Kuusisto | ............ | B60L 11/1861 |
| | | | | 702/63 |
| 2017/0185348 A1* | 6/2017 | Byun | ................... | G06F 3/0656 |

* cited by examiner

NOTIFICATION 600

> THE SIGNAL STRENGTH FOR ACCESS POINT
> 172.16.0.2 AT ROOM 1060 IS -90dBm
>
> ALERT VALUE: -70dBm
> HISTORICAL VALUE: -50dBm

NOTIFICATION 610

> CLEAN UP REQUIRED IN HALLWAY 7-220

COMPUTER SYSTEM AND METHOD FOR AUTOMATED INDOOR SURVEYING BY ROBOTS

FIELD OF THE DISCLOSURE

The present disclosure relates to mobile digital computer controlled robots that autonomously navigate a bounded area. The disclosure relates more specifically to computer-implemented techniques for autonomous collection of sensor data in the bounded area.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Robots are no longer only used in manufacturing. Increasingly, robots have found use in hospitality, medicine, and transportation of goods. Some robots, such as those designed and manufactured by Savioke, Inc. of San Jose, Calif., are wheeled machines that transport goods within a campus or other defined environment, such as a hotel or hospital. These robots are deployed by computer or human operators to complete a task, such as delivering hot towels to a guest room. Once deployed, a particular robot may navigate a building or set of buildings from its current location to its destination.

In order to navigate to its destination, the robot uses data defining a layout of the campus or environment. The data may be stored in the form of a digital map of a campus, building, or floor within a building. The data may include information regarding devices located within the environment, such as signal strength data of WIFI access points. However, statically defining an environment has the significant drawback of requiring an update to data storage or memory of the robot when the environment changes as a result of construction, demolition, additions or modifications to devices, changes in security or other operational policy. Furthermore, a human operator may have to physically travel to locations in the environment to assess whether any changes have occurred. There is a need in the robotics field to digitally define an environment through other than static means.

SUMMARY OF THE INVENTION

The appended claims may serve as a summary of the invention.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

1. General Overview

In one embodiment, digital computer controlled electromechanical robots may be deployed within a building. The robots may be programmed to navigate areas of the building. For example, a robot may be programmed to transport items between people or locations. As another example, a security robot may be programmed to patrol areas of a building. While navigating areas of the building, the robot may be programmed to collect sensor data at various location within the building.

To collect sensor data, the robot traverses or explores an area that an operator selects. At one or more locations, the robot collects and stores initial sensor data in association with the one or more locations. Once the initial sensor data is collected, the robot autonomously determines whether the sensor data needs to be updated. The robot may select one or more locations for which updated sensor data is collected based on one or more of: stored parameters, a location relating to a task assigned to the robot, a route being planned or traversed by the robot, a target destination of the robot, or the status of the robot.

Additionally or alternatively, robot may store collected sensor data in association with a collection time. A graphical map or report may be generated that provides a comparison of sensor data across two or more points in time.

Additionally or alternatively, while collecting updated sensor data, the robot may analyze the collected sensor data and generate a notification if it determines that the sensor data is unusual. Determining that sensor data is unusual may be based on programmed or user-defined parameters or through machine learning techniques.

For purposes of illustrating clear examples, certain sections of this disclosure refer to specific environments such as a hotel or building, or to specific environmental features such as floors or elevators. However, these examples are provided only for clarity and are not intended to limit the scope of the disclosure. For example, the term "environment" may include buildings of any kind including hotels, offices, hospitals, homes, museums, restaurants or any other space that is capable of traversal by a mobile ground traveling autonomous vehicle such as a robot. Features of environments may include floors, levels, stairways, ramps, slides, elevators, doors, windows, sidelights, transoms, tunnels, breezeways, skywalks, portals, columns, partitions, walls, objects, obstacles and so forth. Features of the environment may also include furnishings that are not attached to the building that are not frequently moved, such as couches, chairs, tables, desks, vending machines, ice machines, kiosks, storage furniture, and etc.

2. Networked Environment

Figure 1:
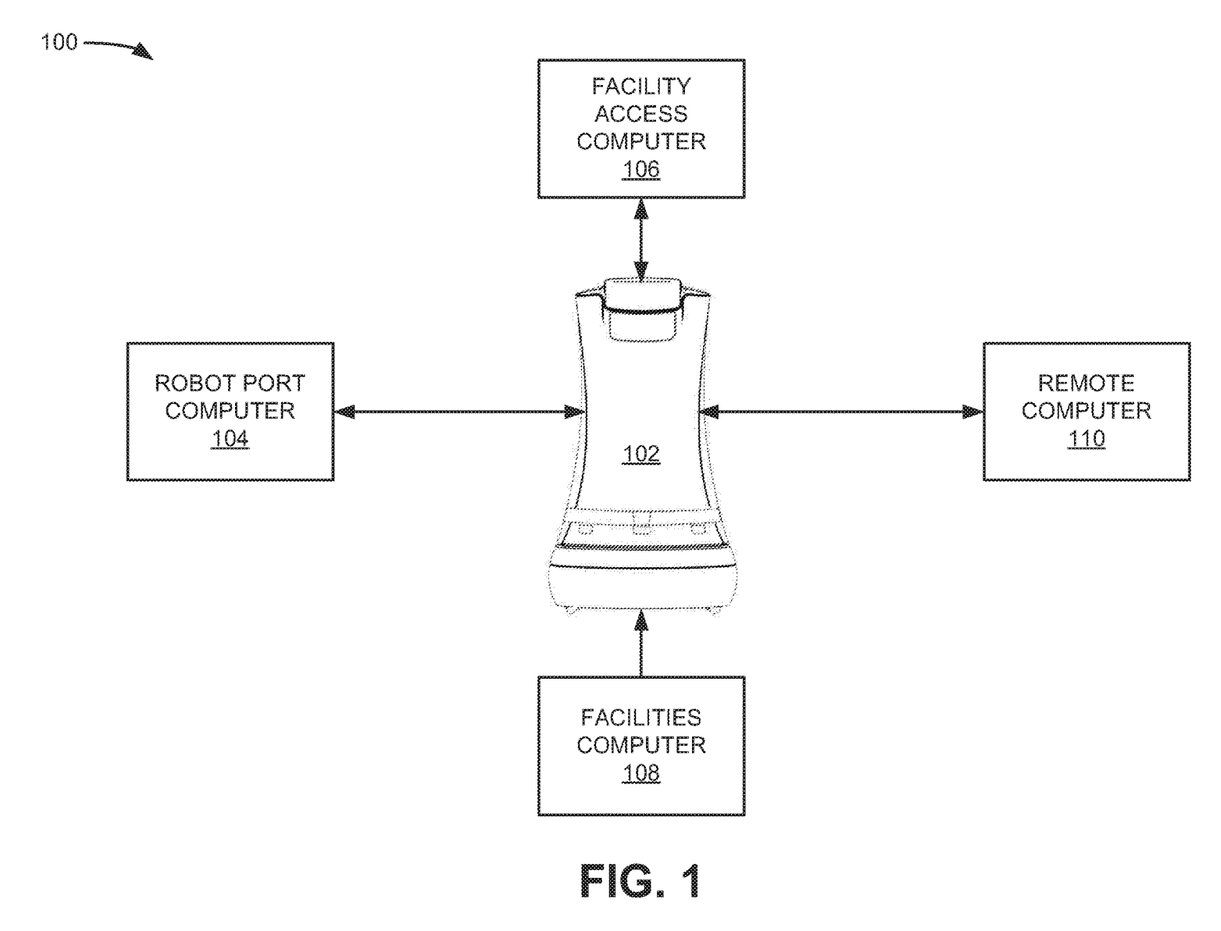
FIG. 1 is a diagram of a networked environment in which a robot may operate, according to various embodiments.

FIG. 1 is a diagram of an example networked environment in which a robot may operate, according to various embodiments.

The networked environment 100 of FIG. 1 provides certain computing infrastructure to support a robot 102, to allow the robot to access building features such as locked doors or elevators, and to allow an operator to communicate directly with the robot. The networked environment 100 includes the robot and one or more computers that are local to the building or campus in which the robot is deployed. In some embodiments, remote computers may be included in the networked environment 100. The local computers within the networked environment 100 may be physically present in the building.

In this example, the robot 102 is an autonomous, wheeled, battery-powered electro-mechanical robot under control of a programmed digital computer contained in the robot. The robot 102 moves using a set of wheels mounted on the bottom surface of the robot. The robot 102 may move at velocities appropriate to its environment, typically at a human walking speed or slower. The wheels of the robot 102 may be selected for performance on a variety of indoor and outdoor surfaces including tile, carpet, and concrete.

In some embodiments, robot 102 includes at least one storage compartment that can be electronically opened by the robot for access by an operator or human at an origin or destination. The storage compartment may be sized to hold items that are appropriate to the environment. For example, in hospitality applications, the storage compartment may permit carrying any of: linens; toiletries; medications; magazines and reading materials; lost and found items such as wallets, keys, and personal electronic devices.

The storage compartment may have an electronic lock that is controlled by the robot 102. In some embodiments, robot 102 is programmed to open the storage compartment upon arriving at its destination or in response to an instruction or sensor when the destination is reached. The instruction may include, for example, a passcode; a confirmation of the person's identity at the destination; an electronic communication with a personal electronic device of the person receiving the delivery via, for example, RFID or Bluetooth. The storage compartment may include a scale, pressure switch or other mechanism to detect the placement or removal of items in or from the storage compartment, such that placing an item in the compartment depresses the scale or triggers the switch and removing the item from the compartment releases the scale or switch. A digital interface may gate or latch a signal from the scale or switch to instruct the computer in the robot that an item was placed on or removed from the compartment.

In an embodiment, robot 102 includes a touchscreen that displays a graphical user interface (GUI) to communicate messages and that is generated under program control. The GUI may receive input via the touchscreen and the input may represent instructions for operation of the robot 102. Additionally or alternatively, the GUI may be displayed at a remote computer, such as facilities computer 108, robot port computer 104, or remote computer 110, in networked environment 100. The instructions may include an instruction to open the storage compartment, a response to a request for information presented by the robot during an autonomous mapping operation; an alert in response to receiving unusual sensor data during an autonomous collection operation; a confirmation that the item, or the correct item, is in the storage compartment and is delivered. In some embodiments, other input mechanisms such as keyboards may be incorporated in robot 102.

In an embodiment, robot 102 includes numerous sensors for receiving data about the building and its location within the building. These sensors include, for example, laser sensors, Light Detection and Ranging (LIDAR) position or motion sensors, 3D cameras, color cameras, accelerometers, barometers, altimeters, thermometers, humidity meters, or others. In an embodiment, the laser sensors, LIDAR, 3D cameras, and color cameras collect data that can be transformed under program control to form a model of an environment and its obstructions or objects; dimensions of features such as rooms, hallways, doors, and windows; identification of features including staircases, elevators, doorways, signs, and fiducials; and other environment data. In an embodiment, the barometer detects an altitude of the robot 102 based on digitally transforming a reading of ambient atmospheric pressure and provides data that may be used, for example, to identify a floor on which the robot 102 is currently located if the environment is multi-story. In an embodiment, the accelerometer provides data about the speed and/or direction of the movement of the robot 102, alone or in combination with a digital compass. In an embodiment, the thermometer provides data about the ambient temperature of the location at which the robot 102 is currently located. In an embodiment, a humidity meter or other moisture sensor provides data about the humidity of the location at which the robot 102 is currently located, or about whether water or other liquids are detected at the location.

In an embodiment, robot 102 comprises one or more network interfaces that communicate with the computers within the networked environment 100. The network interfaces may include interfaces that communicate via Wireless Fidelity (WIFI), 3G and/or 4G modems, Bluetooth, infrared, and low-bandwidth radio. In some embodiments, the robot 102 uses a Global Positioning System (GPS) to determine its location. In some embodiments, the robot 102 uses the WIFI interface to wirelessly transmit signals to other wired or wireless networked devices to open doors, or call and direct an elevator.

In an embodiment, robot 102 uses one or more network interfaces to receive a signal from a device such as a WIFI router, a modem, a Bluetooth or infrared device, and the like, and digitally transforms the signal data to determine a signal measurement. The signal measurement may indicate a signal strength or signal quality of the device.

In an embodiment, robot 102 executes mapping software stored in memory. The mapping software, when executed, causes the robot to generate a robot-readable map of its location and/or a route to a destination. In an embodiment, the mapping software instructs the robot 102 to traverse or explore its environment using the onboard sensors. In an embodiment, based on the traversal, the mapping software generates a map of a floor or other environment. Additionally or alternatively, the map may comprise data describing a plurality of areas of the environment. The data may include sensor data such as signal strength, quality, or intensity information, images of an area, temperature, acceleration, and etc. The data may be stored in one or more map layers. In an embodiment, sensor data may be stored separately in association with data indicating the location from which the sensor data was collected. The sensor data and location data may be used to generate and cause display of a sensor data map to an operator.

In an embodiment, the environment includes a robot port having a robot port computer 104. The robot port is a device in which, or next to which, the robot 102 returns when not in use. In an embodiment, the robot port may include power connections to which the robot 102 can automatically connect and that charge a battery of the robot. For example, the robot and port may be structured to enable the robot to automatically contact the power connections when the port is reached or mechanically engaged.

In an embodiment, the port further comprises a data interface and data connector to which the robot 102 may automatically connect or engage when the robot is in the port. Or, the robot 102 may have internal wireless networking circuitry that is interfaced to its CPU and appropriate software to permit the robot to establish a wireless network connection to a nearby access point and thereby reach a host computer to upload or download data. In an embodiment, using the data interface of the port or the wireless interface, the robot port computer 104 may download from the robot 102 data comprising a list of deliveries, a history of the robot's, and communications between the robot and other computers or received via the GUI.

In some instances, the robot port computer 104 or host computer may upload data to the robot 102 including, for example, software updates, map or facility updates, and data used to identify building-specific features such as doors. In some embodiments, port computer 104 or another host computer is programmed to obtain, via a network, environment data for environments other than the one in which robot 102 is located, including traversal data obtained from other robots that have operated in other environments. The other environments may be closely similar to the local environment or different. For example, if the local environment is a building structure that has been constructed according to a plan that has been replicated to construct other similar buildings in other locations, then traversal data obtained from other robots that are geographically distant may be relevant in resolving traversal of obstructions or features of the local environment. Furthermore, robot port computer 104 may act as an intermediary to communicate data between robots 102 deployed within the building or on campus. Additionally or alternatively, robots 102 may receive or upload data directly to other robots, computers within the building or campus, or remote computers 110 using a wireless connection.

In an embodiment, a facilities access computer 106 provides access to building features that accommodate the robot 102. The facilities access computer 106 may provide an application programming interface (API) that the robot 102 is programmed to call with instructions and data configured to direct the facilities access computer to operate elevators and other transportation mechanisms, request operation of electronic doors, or control security sensors. In an embodiment, the facilities access computer 106 communicates with the electronic systems within the building such as elevators, door locks, door opening systems, security sensors, and the like.

In an embodiment, facilities computer 108 is programmed with supervisory functions for one or more robots 102, and provides an interface for an operator to communicate with the robot. The facilities computer 108 may respond to requests made by the robot 102 during autonomous mapping. The facilities computer 108 may deploy the robot 102 on pick-ups, deliveries, or other tasks. In some embodiments, the facilities computer 108 may provide data regarding the location of temporary obstacles in the environment. Examples include holiday decorations, large crowds, and temporary installations. The data may be stored in a persistent data repository and associated with an anticipated expiration date or time-to-live value. The data may be communicated directly to the robot 102 via WIFI or via the robot port computer 104.

In an embodiment, a remote computer 110 in FIG. 1 comprises a computer that is not local to the robot 102 and is not located within the building or campus in which the robot 102 is deployed. The remote computer 110 may communicate data with the robot 102 from outside sources; examples include weather data, news and public interest stories, or other sources that provide data used by the robot 102. In some instances, the remote computer 110 may be, or communicate with, a personal electronic device of a human user who has arranged a delivery. In such instances, the remote computer 110 may be a Short Message Service (SMS) server or Multimedia Message Service (MMS) server.

3. Example Mapping Process

Figure 2:
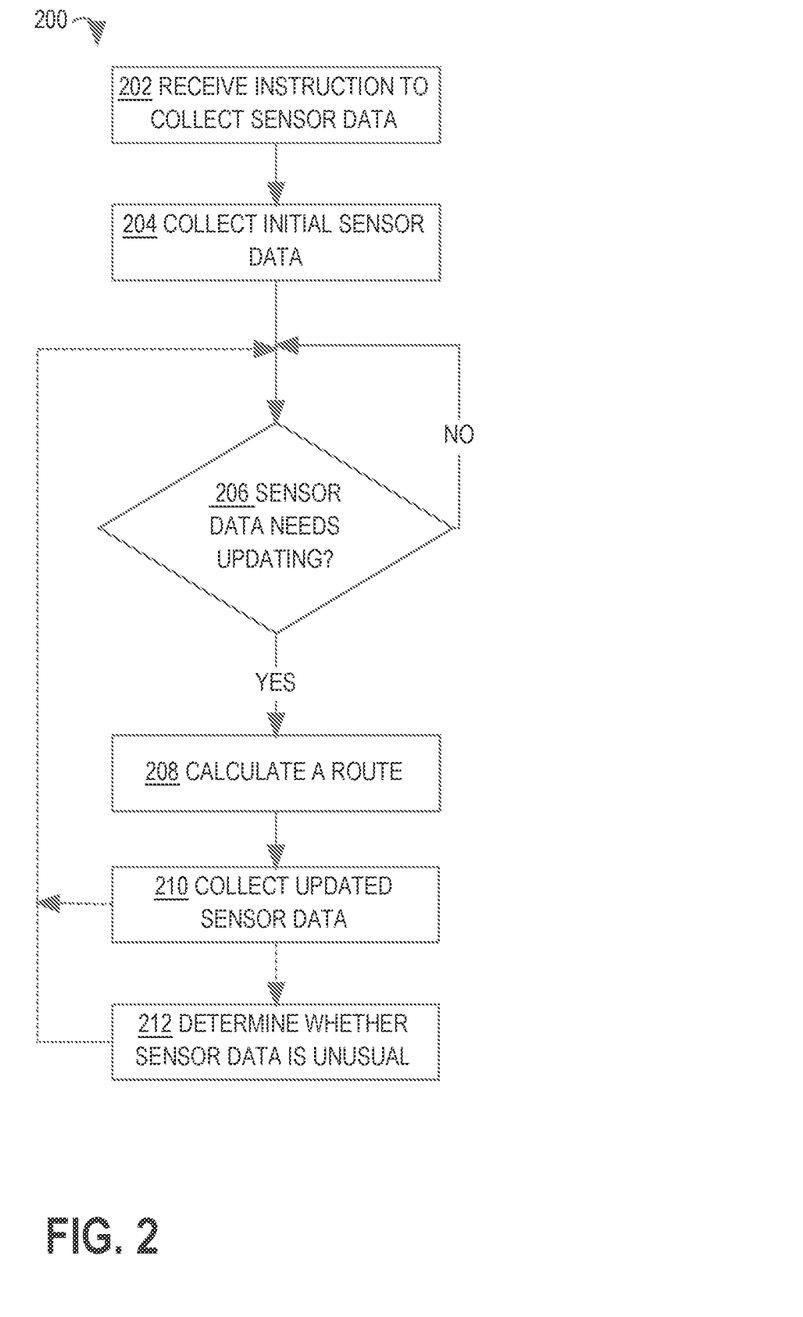
FIG. 2 is a flowchart of an example process for autonomously mapping sensor data of a building, according to some embodiments.

FIG. 2 is a flowchart of an example process that may be programmed in a robot for autonomously collecting sensor data within an environment, according to certain embodiments.

In an embodiment, robot 102 executes a stored program implementing process 200 shortly after arriving in an environment. Robot 102 may be programmed or configured to collect one or more particular types of sensor data. For example, process 200 may be invoked, initiated or executed when the robot 102 is placed in a building for the first time to collect WIFI signal strength data. The robot 102 may collect sensor data in conjunction with generating a digital map used for navigation.

Additionally or alternatively, robot 102 executes a stored program implementing process 200 after receiving an instruction to generate a sensor data map. The instruction may indicate one or more areas in which to collect sensor data. In an embodiment, the instruction may also indicate one or more types of sensor data to collect.

During execution of process 200, robot 102 collects and stores sensor data in memory or other storage at the robot. Additionally, descriptions and labels of where sensor data was captured or acquired may be stored in association with the sensor data. Types of sensor data may include, for example, signal strength measurements emitted by different types of wireless devices, sensor measurements from various onboard sensors of robot 102, images and videos captured by a camera of robot 102, and the like. In an embodiment, the type of sensor data robot 102 is configured to collect may be based on the areas in which sensor data being collected. For example, if the area includes an elevator, sensor data relating to the elevator or operation of the elevator may be collected, such as acceleration, barometric measurements, temperature, noise level, air quality, or images of the elevator.

In an operation 202, the robot receives an instruction to collect sensor data at a plurality of locations in an environment. A location may be, for example, a point on a map, a particular room or hallway, a particular geographic coordinate, and etc. The instruction may indicate a direction to face when collecting sensor data at each location. Additionally, the instruction may indicate one or more types of sensor data to be collected at each location. For example, in the case of a hotel where the sensor data is WIFI signal strength, the plurality of locations may be locations where guests typically access the wireless network, such as in each guestroom or in lounge areas.

In an embodiment, the robot 102 receives a pre-defined route that includes the plurality of locations. Additionally or alternatively, the robot 102 may receive a list of locations and determine, based on a map of the environment, a route that includes the plurality of locations.

In an operation 204, the robot physically traverses the route that includes the plurality of locations. The robot 102 may initiate operation on the route in response to an instruction via the GUI using the touchscreen, for example. To follow the route, robot 102 may operate, either fully autonomously or under partial operator control, to follow a human operator who is walking or following a path corresponding to the route. The operator may indicate, at each location of the plurality of locations that sensor data should be collected at the location. Additionally or alternatively, the robot may autonomously traverse the route, determine when it arrives at each location, and collect sensor data at the location.

Robot 102 is programmed, as part of operation 204, to collect sensor data and store the sensor data in association with location data. In an embodiment, the sensor data is stored as a layer of a robot-generated map. Additionally or alternatively, robot 102 generates and stores a map of sensor data, separate from one or more maps used for navigation. The sensor data map may be a different format than the one or more maps.

Additionally or alternatively, in operation 202, the robot receives an instruction to collect sensor data in one or more pre-defined areas. A pre-defined area may include, for example, a building or portions of a building, a floor of a building, a room, a hallway, or an elevator. In response to receiving the instruction to traverse or explore the area, in operation 204, the robot 102 physically explores the one or more pre-defined areas and collects sensor data. Robot 102 may be configured or programmed to collect sensor data at particular intervals. For example, robot 102 may be configured to collect sensor data every 100 meters. As another example, robot 102 may be configured to collect sensor data at each room in the pre-defined area. Additionally or alternatively, the instructions may indicate a particular interval.

In an embodiment, the instructions may indicate that robot 102 should collect a plurality of sensor data for one or more elevators. In an embodiment, robot 102 is configured to collect different sensor data while the elevator is at various floors or while the elevator is in motion. For example, while the elevator is at each floor, robot 102 may collect barometric and temperature measurements, and capture images of the elevator lobby at each floor. While the elevator is moving, robot 102 may collect acceleration and noise level measurements. Robot 102 may be configured to operate, or interact with a facilities access computer 106 to operate, the one or more elevators. Additionally or alternatively, the robot 102 may be instructed to collect sensor data while the robot is moving. For example, to determine the leveling of the elevator car, the robot may collect acceleration data while it is driving over the threshold of the elevator.

Additionally or alternatively, the robot 102 may detect, using one or more sensors of the robot, objects in the environment that indicate a sensor measurement should be acquired at the location of the objects. An object may be, for example, a sign with a QR codes, image, text, symbols, or any combination thereof. Objects may also include objects that transmit a signal, such as a Bluetooth low-energy signal, that indicate a particular location to the robot 102.

Additionally or alternatively, the robot may be instructed to collect sensor data associated with the location of physical objects within the property. The physical objects may be one or more pre-defined objects. For example, the robot may collect sensor data associated with the location of room trays, laundry carts, luggage, luggage carts, and other objects commonly found in a hotel or other building. In an embodiment, the objects may be recognized or detected by the robot. Additionally or alternatively, data about the location may be gathered by taking a picture or collecting other sensor data at the location where the object(s) are expected to be. Additionally, the sensor data may include information on the state of existing objects in a building. Existing objects may be, for example, trash cans, plants, tables, furniture, or decorations. The robot may collect data indicating whether or not the object is still there, what condition the object is in, or similar information. For example, the robot can check for the health of plants and/or whether or not trash bins are overflowing. As another example, the robot may check for the absence of items, such as, whether doorways clear and not blocked, whether there any room trays or other objects in the hallway.

In an embodiment, the robot 102 receive or stores a sensor data map associating sensor data with location data. The sensor data for one or more locations on the sensor data map may be empty or unavailable. That is, the sensor data map may indicate that sensor data has not been collected for one or more locations. Robot 102 may be configured to identify the one or more locations for which sensor data has not been collected and collect sensor data at the one or more locations.

In an embodiment, the robot 102 receives input indicating that traversal of the environment is complete. For example, an operator may provide an instruction in the GUI using the touchscreen of the robot 102. Additionally or alternatively, the robot 102 determines that traversal is complete when it reaches the end of the route or area that it is traversing or exploring.

In an embodiment, after collecting the initial sensor data, robot 102 goes into standby, waits to receive other tasks, or performs other tasks. In some embodiments, robot 102 may be configured to return to a robot port computer 104 to await further instructions.

In an operation 206, after collecting the initial sensor data, the robot 102 determines whether to collect updated sensor data for one or more locations. In an embodiment, the one or more locations are locations for which robot 102 stores, or has access to, previously collected sensor data. The stored sensor data may be data obtained by the robot 102 or data obtained from other robots that have operated in other locations and received via the port or other updates.

In an embodiment, the robot 102 determines whether sensor data is out of date based on one or more parameters or other configuration data. The parameters may be digitally stored in memory or defined as part of the control program of the robot and retrieved during operation 206. The parameters may indicate a schedule, a maximum or minimum age of sensor data, or other conditions under which sensor data should be updated. Additionally or alternatively, the parameters may indicate restrictions or other conditions under which sensor data should not be updated. Additionally or alternatively, the parameters may associate different types of sensor data with different update conditions. For example, the parameters may indicate that WIFI signal strength data should be updated at least once a week. The parameters may also indicate that WIFI signal strength data should not be updated weekdays between 9 AM and 5 PM.

In an embodiment, robot 102 checks whether sensor data should be updated while the robot is idle (not assigned to and not performing a task). Additionally or alternatively, robot 102 may check whether sensor data should be updated when it is assigned a task, while it is performing a task, and/or after it completes a task. In an embodiment, robot 102 checks whether sensor data should be updated for one or more locations near an assigned task or along a route to/from the assigned task.

In an embodiment, robot 102 determines that updated sensor data should be collected for a plurality of locations and selects a set of one or more locations for which to collect updated sensor data. In an embodiment, the robot 102 is assigned one or more tasks and selects one or more locations that are near an assigned task or along a route to/from an assigned task. Additionally or alternatively, other robots may be able to collect updated sensor data and robot 102 may communicate with other robots to divide updating sensor data for the plurality of locations between robot 102 and the other robots. For example, another robot may be located closer to, or have a route or task near, a first set of locations of the plurality of locations. The other robot may be assigned to update sensor data for the first set of locations and robot 102 may update sensor data for a second set of locations of the plurality of locations.

Additionally or alternatively, robot 102 may determine that sensor data for one or more locations should be updated in response to receiving an instruction to collect updated sensor data. In an embodiment, the instructions indicate one or more locations for which sensor data should be updated. For example, robot 102 may receive instructions via the GUI using the touchscreen to collect updated data at one or more indicated locations. Additionally or alternatively, the instructions may indicate one or more pre-defined areas for which sensor data should be updated. Robot 102 may identify one or more locations in the pre-defined areas that are associated with stored sensor data. Robot 102 may update the sensor data for each of the one or more identified locations.

In response to determining that sensor data needs to be collected for one or more locations, in an operation 208, robot 102 calculates a route to the one or more locations. In an embodiment, robot 102 calculates a route from the current location of the robot to the one or more locations. If robot 102 is currently traversing a route or has an existing route planned, then the robot calculates a modified route that includes the one or more locations. For example, if robot 102 is making a delivery to a destination, the route to the destination may be modified to include the one or more locations. In an embodiment, the instructions to collect updated sensor data indicate a pre-defined route that the robot 102 should traverse.

In an operation 210, the robot 102 physically traverses the route. The robot collects and stores updated sensor data in association with each of the one or more locations. In an embodiment, existing sensor data is replaced with the updated sensor data. In some embodiments, sensor data is stored in association with a collection time. The updated sensor data is stored in addition to existing sensor data. For example, the initial sensor data may be stored in association with an initial collection time. The updated sensor data may be stored in association with an update time.

In an embodiment, the robot is programmed to transmit sensor data and collection times to the facilities computer 108 or another remote host computer. In an embodiment, the facilities computer 108 is programmed to visually display a map in graphical form with the updated sensor data. Additionally or alternatively, the facilities computer 108 may be programmed to display a report comprising updated sensor data.

In an embodiment, the facilities computer 108 may be programmed to receive operator input indicating one or more filters for the sensor data. Example filters include collection times, sensor data types, data quality, data values, collection locations, and etc. For example, the facilities computer 108 may be programmed to receive operator input indicating a first time and a second time, select sensor data corresponding to the first time and the second time, and display a graphical comparison of sensor data at one or more locations.

In an embodiment, sensor data may be transferred continuously during robot traversal so that an operator can view the updated sensor data at facilities computer 108 at the same time that the robot is collecting updated sensor data. This approach permits real-time viewing and comparison of sensor data, rather than in a post-processing step.

Optionally, in an operation 212, robot 102 determines whether the sensor data collected at a location is unusual. Examples of unusual sensor data include sensor data that is above or below a historical value or a threshold value. In the case of an image or video, unusual sensor data may depict an unexpected object, may be missing an expected object, or may depict an object in an unexpected state. In an embodiment, robot 102 is programmed to report the locations with unusual sensor data, at the same time that the sensor data is collected, to a host computer such as facilities computer 108 or a mobile computing device over a wireless network. Additionally or alternatively, robot 102 may be programmed to collect a second updated sensor data at the location, and verify that the second updated sensor data is still unusual.

After collecting the updated sensor data, robot 102 may be programmed or configured to return to operation 206. In some embodiments, robot 102 may go into standby, wait to receive other tasks, or perform other assigned tasks while periodically determining whether additional sensor data updates should be performed.

For the purpose of illustrating a clear example, the foregoing description has ascribed certain operations, functions, and programming to robot 102. However, in other embodiments, the same operations, functions, and programming may be implemented separately from robot 102, such as in a remote host computer, cloud server, or other computing device. For example, the function of determining whether to collect updated sensor data may be implemented in a remote computer that sends an instruction to one or more robots to collect updated sensor data. As another example, a remote computer may be configured to receive updated sensor data from one or more robots, and determine whether the updated sensor data for a location is unusual.

4. Example Robot-Generated Maps

Figure 3:
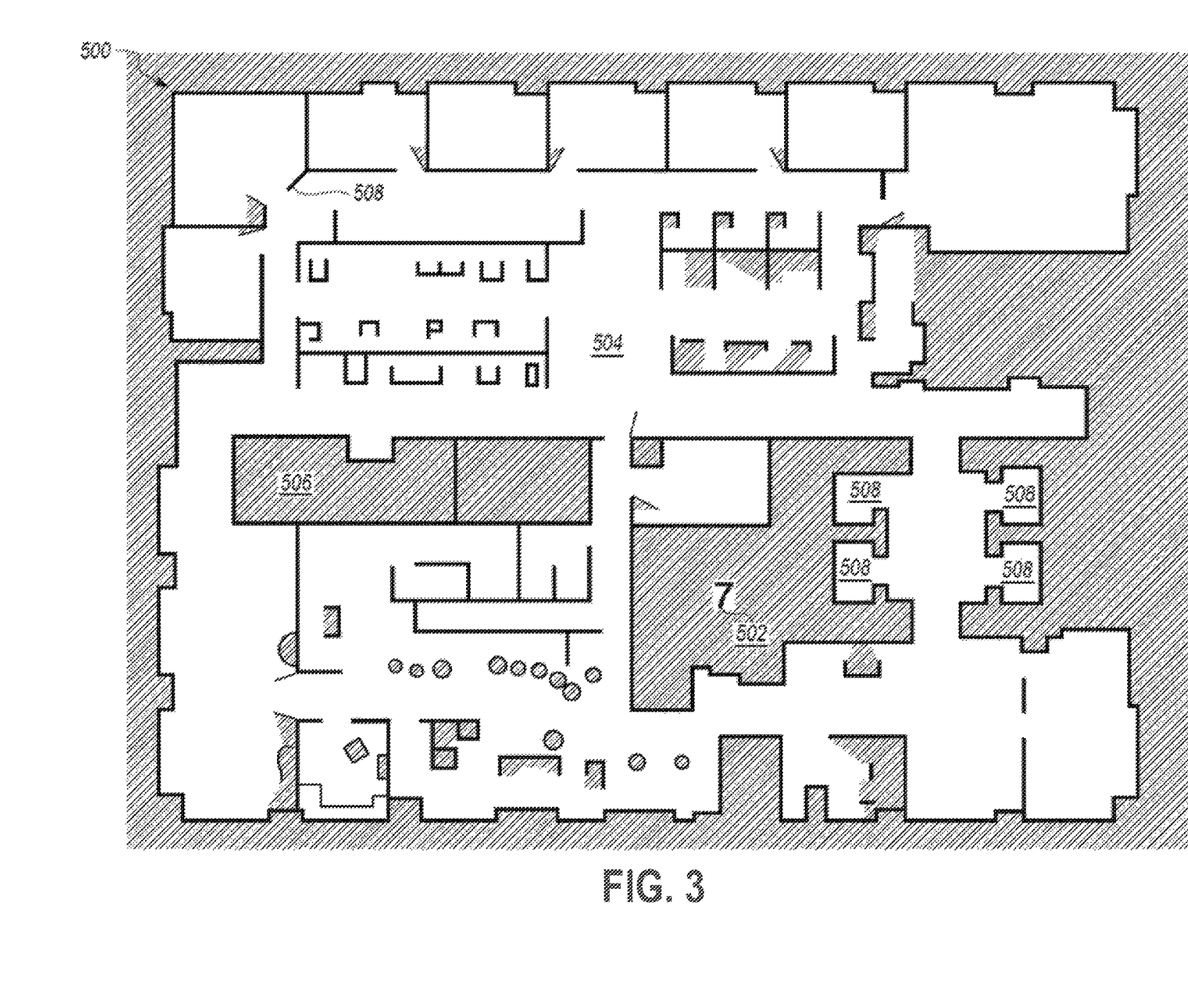
FIG. 3 is an example of a robot-generated map of a floor of a building, according to various embodiments.

FIG. 3 illustrates an example of a robot-generated map. For purposes of illustrating a clear example and not as a limitation, FIG. 3 illustrates a map of a floor of a building.

In an embodiment, map 500 includes an annotation 502 of the floor for which the map was generated. White area 504 is associated with areas having low cost values and corresponds to spaces that are navigable by the robot including hallway and larger rooms. Gray areas 506 include areas that the robot can navigate, with a higher cost of navigation, and are associated with higher cost values. These areas may include, for example, bathrooms, small rooms or corners, or cluttered areas. Black lines have high or infinite cost values and correspond to interior or exterior walls. Elevators 508 may be used by the robot 102 to navigate between floors.

Additionally or alternatively, a robot-generated map may comprise graph data that defines a plurality of nodes and edges. Each node may represent a location navigable by the robot, such as a hallway or a room. Each edge may represent an ability to move from one location to a connected location. Additionally, each edge may be associated with a cost to move from a location to the connected location. Additionally or alternatively, if the cost of navigation is too high, for example if the rooms are connected by a set of stairs, then the robot-generated map may not include the edge in the graph.

Additionally or alternatively, a robot-generated map may comprise other types of data that describe the environment. For example, the robot-generated map may comprise data associating a plurality of map features with respective location information. Other example maps may include object semantic maps and free space maps. The techniques described herein are not limited to any particular type of robot-generated map.

In an embodiment, sensor data collected by robot 102 is stored as one or more layers of a digital map. Additionally or alternatively, robot 102 may generate and store a separate sensor data map. Additionally or alternatively, robot 102 may store sensor data in other formats that associate sensor data with respective location data.

In an embodiment, a digital map comprises a plurality of pixels representing locations in an environment. One or more pixels may be associated with sensor data collected at the corresponding location.

Additionally or alternatively, a digital map may comprise a plurality of nodes representing locations in the environment. Each node may include sensor data collected at the corresponding location.

Additionally or alternatively, sensor data may be categorized based on the sensor data value. For example, WIFI signal strength may be classified as "strong," "fair," "weak," or "poor." A map of sensor data may graphically indicate which areas are associated with sensor data of which category. In the current example, a map of WIFI signal strength may be a heat map that indicates areas with "strong" WIFI signal in a first color, "fair" WIFI signal in a second color, and so on.

Additionally, sensor data may be a sensor data type with continuous, rather than discrete values. In an embodiment, a map of sensor data comprises gradient values and indicates sensor data values at any location on the map, rather than at discrete locations.

Figure 4:
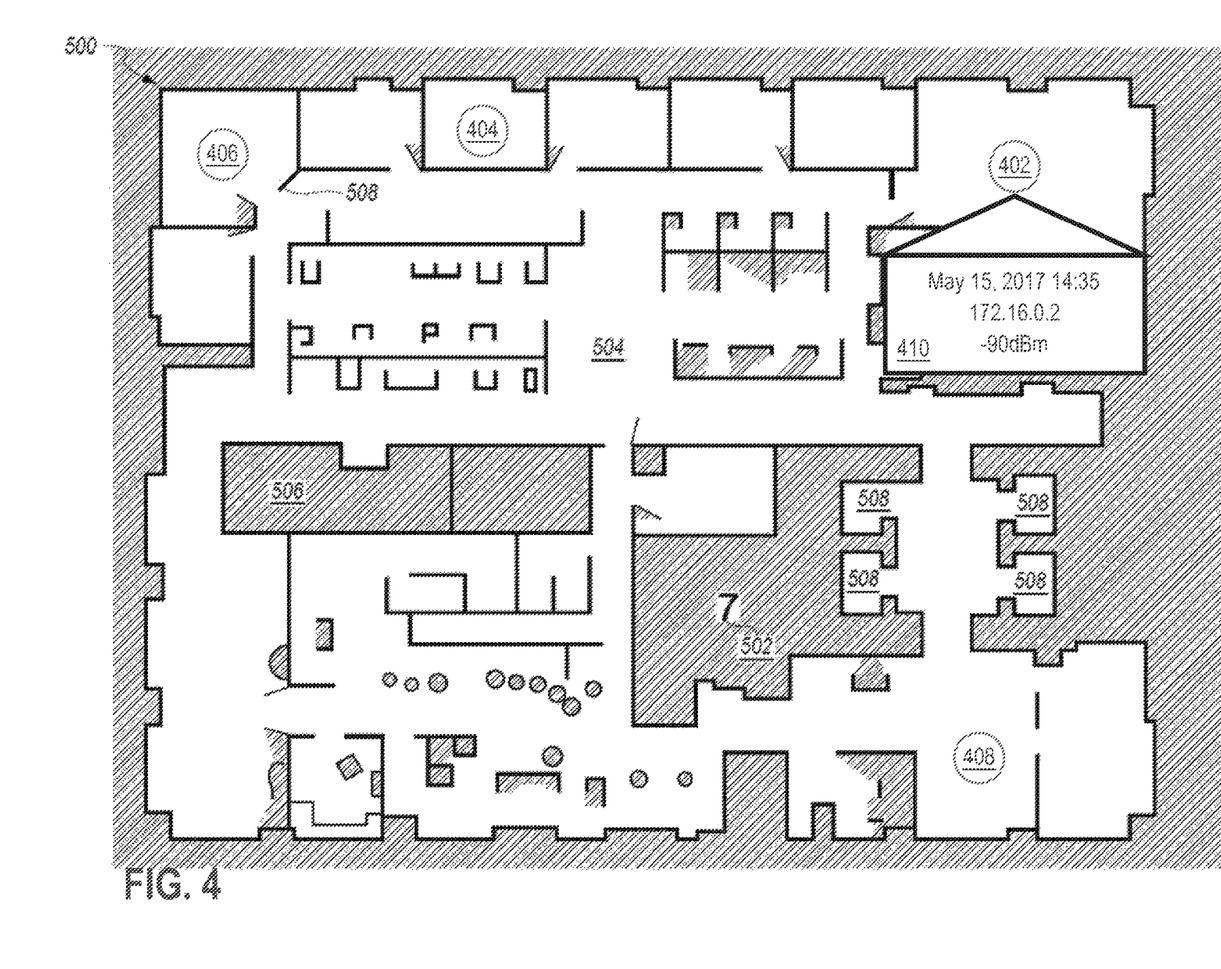
FIG. 4 is a diagram associating sensor data with locations in a floor of a building, according to various embodiments.

FIG. 4 illustrates an example of map associating locations with sensor data. For the purposes of illustrating a clear example, sensor data is depicted as a map layer of map 500. In FIG. 4, sensor data is associated with rooms in the building.

In the illustrated embodiment, map 500 depicts a plurality of locations for which sensor data was collected, such as locations 402, 404, 406, and 408. Each location is associated with respective sensor data, such as a particular sensor measurement, image, or other sensor data. Additionally, each location may be associated with additional information such as a location identifier, sensor data type, sensor data classification, and etc.

In the illustrated example, location 402 is associated with sensor data 410. For the purpose of illustrating a clear example, assume the sensor data comprises WIFI signal strength measurements. Sensor data 410 indicates the time at which the data was collected, the measurement that was collected, and the access point corresponding to the measurement.

In an embodiment, sensor data is stored in association with respective collection time. A location may be associated with a plurality of sensor data, each of which was collected at a different time. A sensor data map may display one or more sensor data for each location. The sensor map may indicate the collection time for each sensor data.

Figure 5:
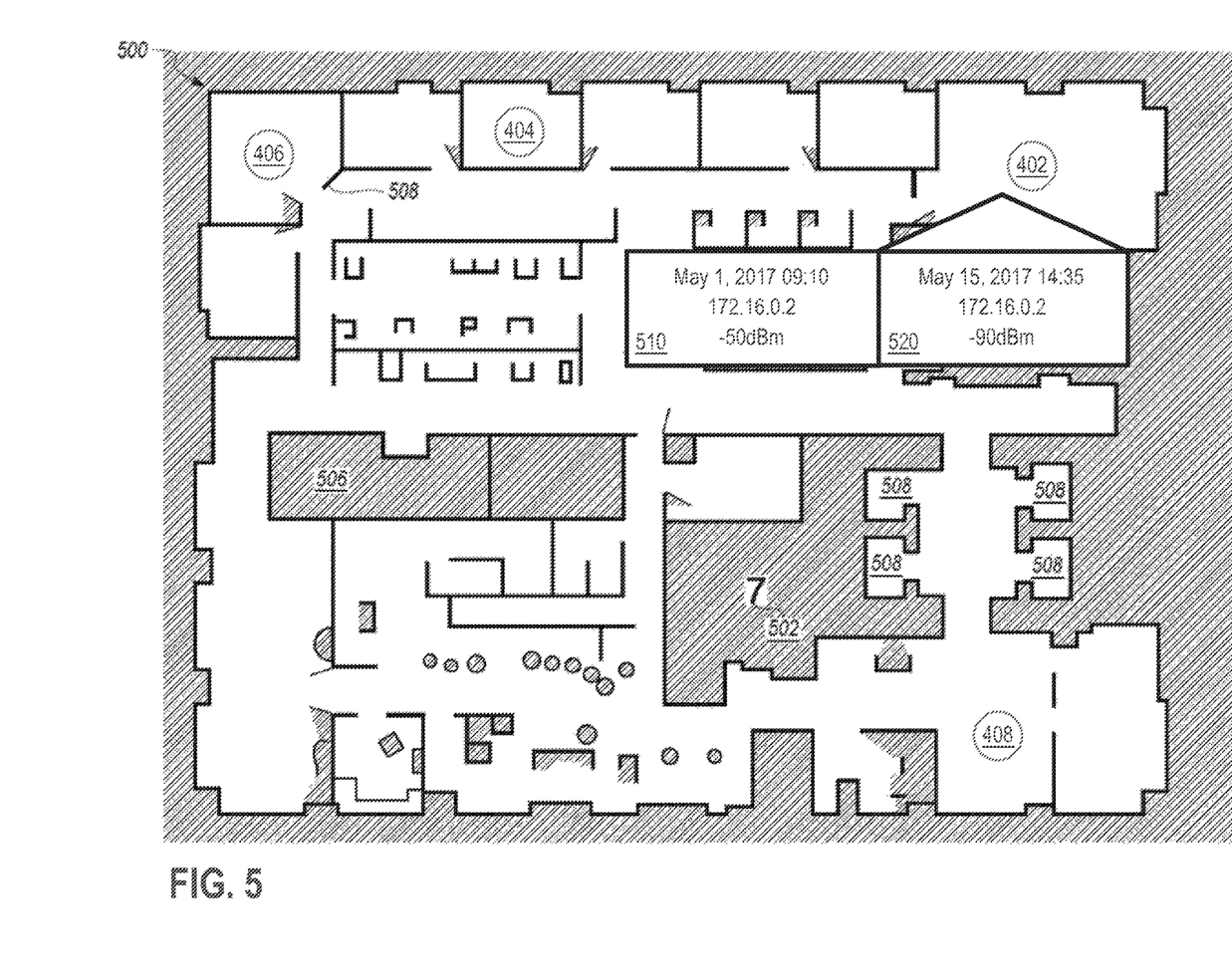
FIG. 5 is a diagram comparing sensor data associated with different collection times, according to various embodiments.

FIG. 5 illustrates an example map comparing sensor data. Location 402 is associated with sensor data 510 and sensor data 520. Each sensor data indicates the time the sensor data was collected, measurement that was collected at that time, and the access point corresponding to the measurement.

In an embodiment, a host computer such as facilities computer 108 may be programmed to receive collected sensor data and respective location data. The host computer is programmed to visually display a map or other report comprising the sensor data and location data. For example, facilities computer 108 may be programmed to display the map 500 illustrated in FIG. 4.

Additionally, the host computer may be programmed to receive operator input indicating one or more filters for the sensor data. Example filters include collection times, sensor data types, data quality, data values, collection locations, and etc. In response to receiving the input, the host computer updates the map or report based on the one or more filters.

For example, the facilities computer 108 may be programmed to receive operator input indicating a first time and a second time, select sensor data corresponding to the first time and the second time, and display a graphical comparison of sensor data at one or more locations, such as the sensor data map illustrated in FIG. 5.

5. Example Graphical User Interface

Figure 6:
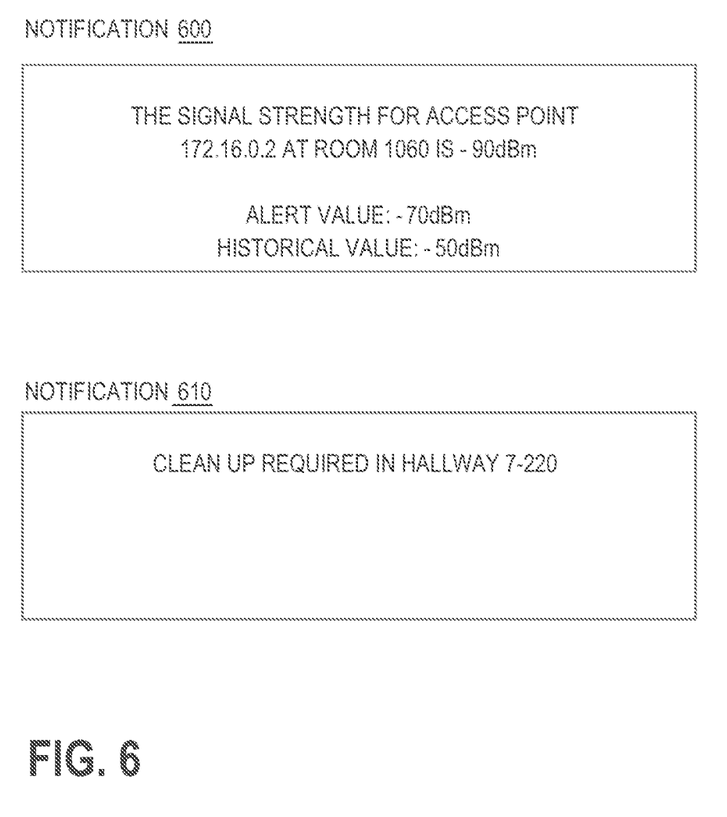
FIG. 6 is example user interfaces describing notifications based on captured sensor data, according to various embodiments.

FIG. 6 illustrates portions of example graphical user interfaces 600 and 610 that describe notifications or alerts based on collected sensor data, according to various embodiments.

In an embodiment, robot 102 may be programmed to generate and display notifications 600 and 610 using a touchscreen of the robot. In other embodiments, notifications 600 and 610 may be presented to the user within an application program that is executed by facilities computer 108, or in a web application that is generated by a networked server computer and accessed using a browser at a computer such as the facilities computer 108. In some embodiments, the notifications 600 and 610 may be delivered using one or more hypertext markup language (HTML) email messages.

In an embodiment, robot 102 generates notifications 600 and 610 to alert an operator of unusual sensor data detected while collecting updated sensor data. Determining that sensor data is unusual may comprise determining whether the sensor data differs from a historical or average value by a threshold amount, or whether the sensor data is above or below a threshold value. Additionally or alternatively, machine learning techniques may be used to classify sensor data as an outlier or not.

In an embodiment, the determination is based on configuration data that specifies how to determine when to generate an alert for particular sensor data. The configuration data may differ for each type of sensor, type of sensor data, the location or a particular device associated with the sensor data. The configuration data may be digitally stored in memory or defined as part of the control program of the robot and retrieved in response to specified conditions as determined by algorithms programmed in the control program.

In an embodiment, the alert indicates an action for an operator or other user to take. For example, the alert may instruct personnel that a location, or a device at a location, requires further in-person inspection. Additionally or alternatively, the alert may display the unusual sensor data associated with the alert. The alert may also indicate the threshold value, historical value, or other conditions that caused the robot to determine the sensor data is unusual. Additionally or alternatively, the alert may display a time at which the unusual sensor data was collected.

In an embodiment, if sensor data comprises images or videos, robot 102 may be configured to analyze an image or video and identify one or more objects depicted in the image or video. Unusual sensor data may include whether an expected object is not visible, an unexpected object is visible, an object is not located where it should be, or an object does not look the way it should be. For example, a robot capturing images in a hotel may analyze an image of a hallway and generate an alert if plates have been left in the hallway. As another example, a robot capturing images of doors and windows in a building may analyze an image and generate an alert if a door or window was broken or left open.

Notification 600 illustrates an example alert indicating unusual sensor data. Notification 600 indicates the signal strength for a WIFI access point at a particular location. For the purpose of illustrating a clear example, assume robot 102 is configured to generate an alert when sensor data exceeds a threshold value. Notification 600 indicates that the detected signal strength value is −90 dBm and the alert value is −70 dBm. Additionally, notification 600 indicates that the historical value is −50 dBm. or alternately, robot 102 may be configured to generate an alert when sensor data exceeds a historical value by a threshold amount, such as −20 dBm.

Notification 610 illustrates an example alert indicating an action should be taken. For the purpose of illustrating a clear example, assume robot 102 is configured to capture images of hallways, analyze the images to determine whether an image depicts trash or spills, and generate an alert when trash or spills are detected. In the illustrated example, notification 610 indicates that clean up is required in hallway 7-220.

Additionally or alternatively, sensor data may be presented to an operator or other user without analyzing whether the sensor data is unusual. For example, a graphical user interface may present a map, listing, table, gallery, or other display of recently collected sensor data. The operator or user may view the display to determine whether the sensor data includes unusual sensor data.

As an example, assume the sensor data includes images of hallways in a hotel. The most recent image, or a thumbnail of the most recent image, for each hallway may be displayed in a user interface. For privacy reasons, the hotel may not otherwise have cameras placed in each hallway. A user may view the list of collected images and quickly determine whether any objects, such as trays or plates, have been placed in any of the hallways, without going in-person to each hallway.

6. Implementation Example—Computer Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
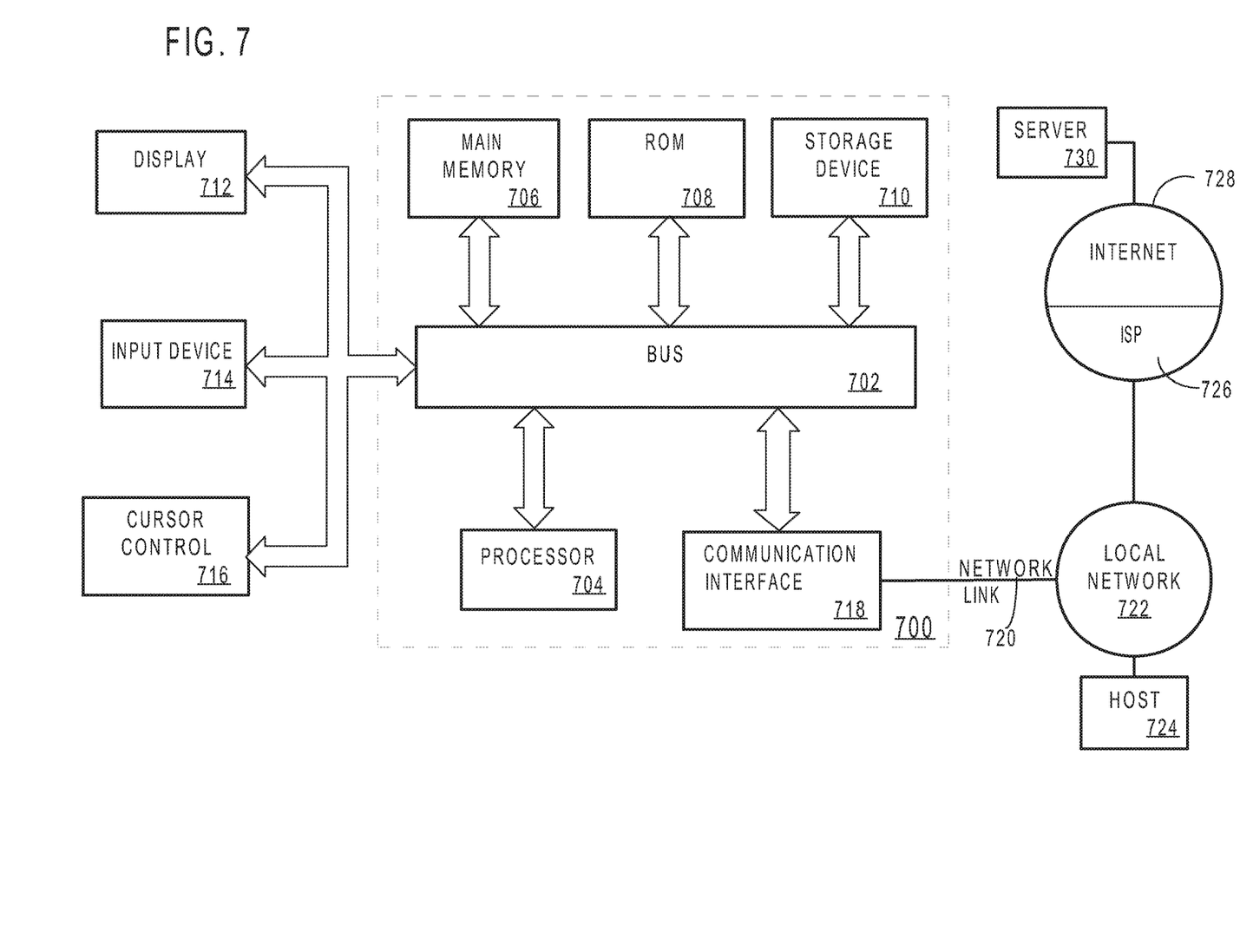
FIG. 7 is a block diagram that illustrates a computer system upon which an embodiment of the invention may be implemented.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or solid-state drive is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane. Display 712 may also be touch-enabled for communicating gestures, touch interactions, and other user interactions to processor 704.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 710. Volatile media includes dynamic memory, such as main memory 706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
  determining, based on an initial map and one or more stored parameters, whether one or more portions of the initial map should be updated, wherein the initial map represents a plurality of locations within an environment, and wherein each location of the plurality of locations is associated with first sensor data;
  in response to determining one or more portions of the initial map should be updated, causing:
    calculating a route to one or more target locations corresponding to the one or more portions of the initial map;
    a robot physically traversing the environment on the route;
    during the traversing the environment on the route, the robot collecting second sensor data from one or more sensors of the robot at each target location of the one or more target locations;
    generating updated map data associating each target location of the one or more target locations with respective updated sensor data based on the second sensor data.

2. The method of claim 1 wherein the initial map associates the sensor data of each location with an initial time and wherein the updated map data associates the sensor data of each target location with an update time.

3. The method of claim 2 further comprising:
  receiving input specifying a first time and a second time;
  in response to receiving the input, generating a comparison map, wherein the comparison map indicates, for one or more comparison locations of the plurality of locations, at least first sensor data associated with the first time and second sensor data associated with the second time.

4. The method of claim 2 wherein the initial map is stored in association with the initial time, the method further comprising storing an updated map in association with the update time.

5. The method of claim 1 wherein at least one stored parameter of the one or more stored parameters indicates a schedule.

6. The method of claim 1 wherein at least one stored parameter of the one or more stored parameters indicates a maximum sensor measurement age.

7. The method of claim 1 wherein the sensor data comprises signal strength measurements.

8. The method of claim 1 wherein the sensor data comprises digital images.

9. The method of claim 1 wherein determining the one or more portions of the initial map should be updated comprises:
  determining a plurality of portions of the initial map should be updated;
  selecting one or more portions of the plurality of portions based on one or more of: a current location of the robot, a location of a task assigned to the robot, and a destination location of the robot.

10. A method comprising:
  reading, at a robot, a digitally stored initial map representing a plurality of locations within an environment, wherein each location of the plurality of locations is associated with first sensor data;
  determining, based on the initial map and one or more stored parameters, whether one or more portions of the initial map should be updated;
  in response to determining one or more portions of the initial map should be updated, causing:
    calculating a route to one or more target locations corresponding to the one or more portions of the initial map;
    the robot physically traversing the environment on the route;
    during the traversing the environment on the route, the robot collecting second sensor data from one or more sensors of the robot at each target location of the one or more target locations;
    the robot generating updated map data associating each target location of the one or more target locations with respective updated sensor data based on the second sensor data.

11. A system comprising:
  one or more processors;
  a non-transitory computer-readable storage medium storing instructions which, when executed by the one or more processors, cause performing:
  determining, based on the initial map and one or more stored parameters, whether one or more portions of the initial map should be updated, wherein the initial map represents a plurality of locations within an environment, and wherein each location of the plurality of locations is associated with first sensor data;
  in response to determining one or more portions of the initial map should be updated, causing:
    calculating a route to one or more target locations corresponding to the one or more portions of the initial map;
    a robot physically traversing the environment on the route;
    during the traversing the environment on the route, the robot collecting second sensor data from one or more sensors of the robot at each target location of the one or more target locations;
    generating updated map data associating each target location of the one or more target locations with respective updated sensor data based on the second sensor data.

12. The robot of claim 11 wherein the initial map associates the sensor data of each location with an initial time and wherein the updated map data associates the sensor data of each target location with an update time.

13. The robot of claim 12, further comprising instructions which when executed by the one or more processors cause:
  receiving input specifying a first time and a second time;
  in response to receiving the input, generating a comparison map, wherein the comparison map indicates, for one or more comparison locations of the plurality of locations, at least first sensor data associated with the first time and second sensor data associated with the second time.

14. The robot of claim 12 wherein the initial map is stored in association with the initial time, the robot further comprising instructions which when executed by the one or more processors cause storing an updated map in association with the update time.

15. The robot of claim 11 wherein at least one stored parameter of the one or more stored parameters indicates a schedule.

16. The robot of claim 11 wherein at least one stored parameter of the one or more stored parameters indicates a maximum sensor measurement age.

17. The robot of claim 11 wherein the sensor data comprises signal strength measurements.

18. The robot of claim 11 wherein the sensor data comprises digital images.

19. The robot of claim 11 wherein determining the one or more portions of the initial map should be updated comprises:
  determining a plurality of portions of the initial map should be updated;
  selecting one or more portions of the plurality of portions based on one or more of: a current location of the robot, a location of a task assigned to the robot, and a destination location of the robot.

20. A robot comprising:
  one or more sensors that collect data;
  one or more processors;
  a non-transitory computer-readable storage medium storing instructions which, when executed by the one or more processors, cause performing:
  reading a digitally stored initial map representing a plurality of locations within an environment, wherein each location of the plurality of locations is associated with first sensor data;
  determining, based on the initial map and one or more stored parameters, whether one or more portions of the initial map should be updated;
  in response to determining one or more portions of the initial map should be updated, causing:
    calculating a route to one or more target locations corresponding to the one or more portions of the initial map;
    the robot physically traversing the environment on the route;
    during the traversing the environment on the route, the robot collecting second sensor data from one or more sensors of the robot at each target location of the one or more target locations;
    the robot generating updated map data associating each target location of the one or more target locations with respective updated sensor data based on the second sensor data.

* * * * *